(12) United States Patent
Boyd et al.

(10) Patent No.: US 6,823,437 B2
(45) Date of Patent: Nov. 23, 2004

(54) LAZY DEREGISTRATION PROTOCOL FOR A SPLIT SOCKET STACK

(75) Inventors: William Todd Boyd, Poughkeepsie, NY (US); Douglas J. Joseph, Danbury, CT (US); Renato John Recio, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 320 days.

(21) Appl. No.: 10/195,180

(22) Filed: Jul. 11, 2002

(65) Prior Publication Data

US 2004/0010674 A1 Jan. 15, 2004

(51) Int. Cl.[7] .............................................. G06F 12/00
(52) U.S. Cl. ..................... 711/170; 711/203; 710/22; 702/212
(58) Field of Search ................................. 711/170, 203; 710/22; 702/212

(56) References Cited

U.S. PATENT DOCUMENTS

| | | | | |
|---|---|---|---|---|
| 5,392,415 A | * | 2/1995 | Badovinatz et al. | 718/100 |
| 6,034,963 A | | 3/2000 | Minami et al. | 370/401 |
| 6,233,244 B1 | * | 5/2001 | Runaldue et al. | 370/412 |
| 6,662,289 B1 | * | 12/2003 | Ang | 711/202 |
| 6,701,420 B1 | * | 3/2004 | Hamilton et al. | 711/170 |

OTHER PUBLICATIONS

Intel, "Offload Sockets Framework and Sockets Direct Protocol High Level Design", Jun. 2002, p. 2–1, (5–18)–(5–19).*

IBTA, "InfiniBand Architecture Specification vol. 1" Jun. 2001, Release 1.0.a, p. 92–94.*

Dubnicki et al, "Software Support for Virtual Memory-Mapped Comunication", 1996, Proc of IPPS '96, p. 372–381.*

* cited by examiner

*Primary Examiner*—Mano Padmanabhan
*Assistant Examiner*—Paul A Baker
(74) *Attorney, Agent, or Firm*—Duke W. Yee; Casimer K. Salys

(57) ABSTRACT

A method, computer program product, and distributed data processing system for lazy deregistration of memory regions. Specifically, the present invention is directed to memory regions that are written to and from by an Integrated Protocol Suite Offload Engine (IPSOE) in accordance with a preferred embodiment of the present invention. A mechanism is provided for lazy deregistration of memory regions once the region is no longer required for a specific data transfer being carried out by the IPSOE. Rather than deregistering a memory region after a data transfer has been carried out, the memory region remains registered for some selected period of time. After that selected period of time passes, the region is then deregistered. If a second data transfer using this memory region occurs while the memory region is still registered, the registration overhead is avoided for this second data transfer. This mechanism reduces the amount of CPU resources required for transferring data by allowing reuse of previously registered memory regions.

36 Claims, 10 Drawing Sheets

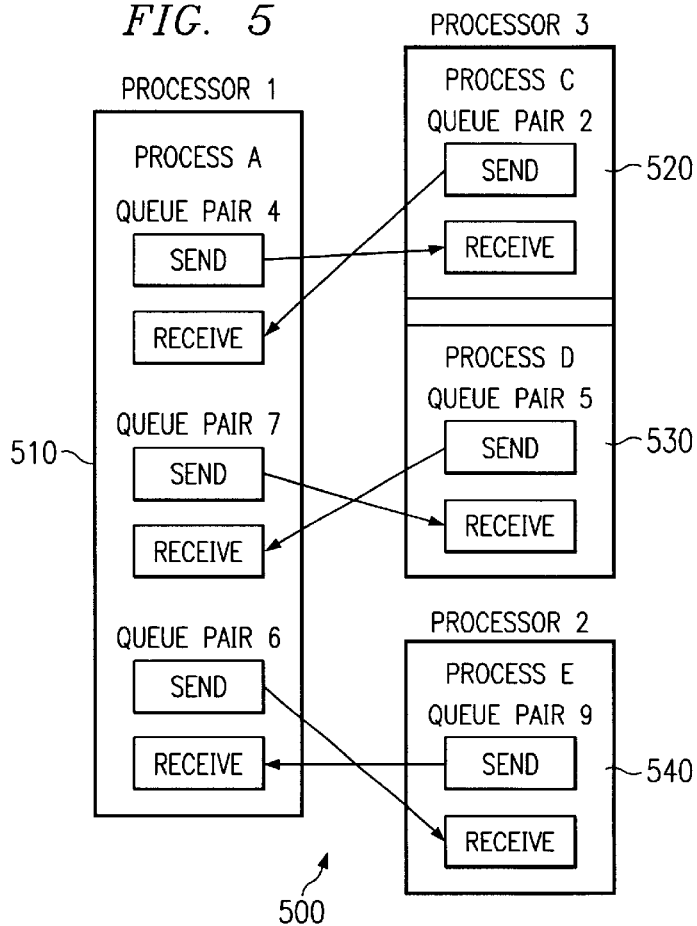
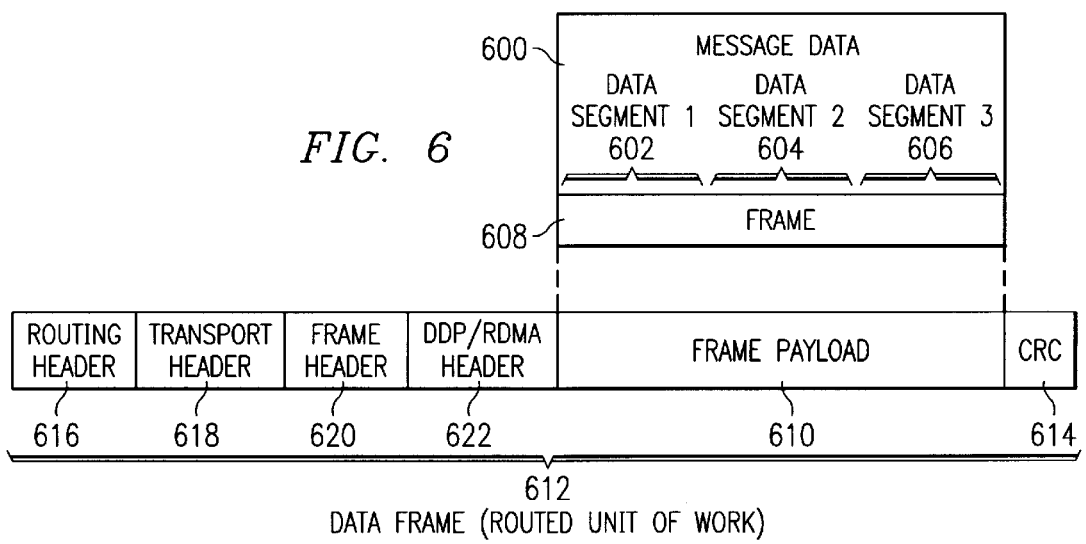

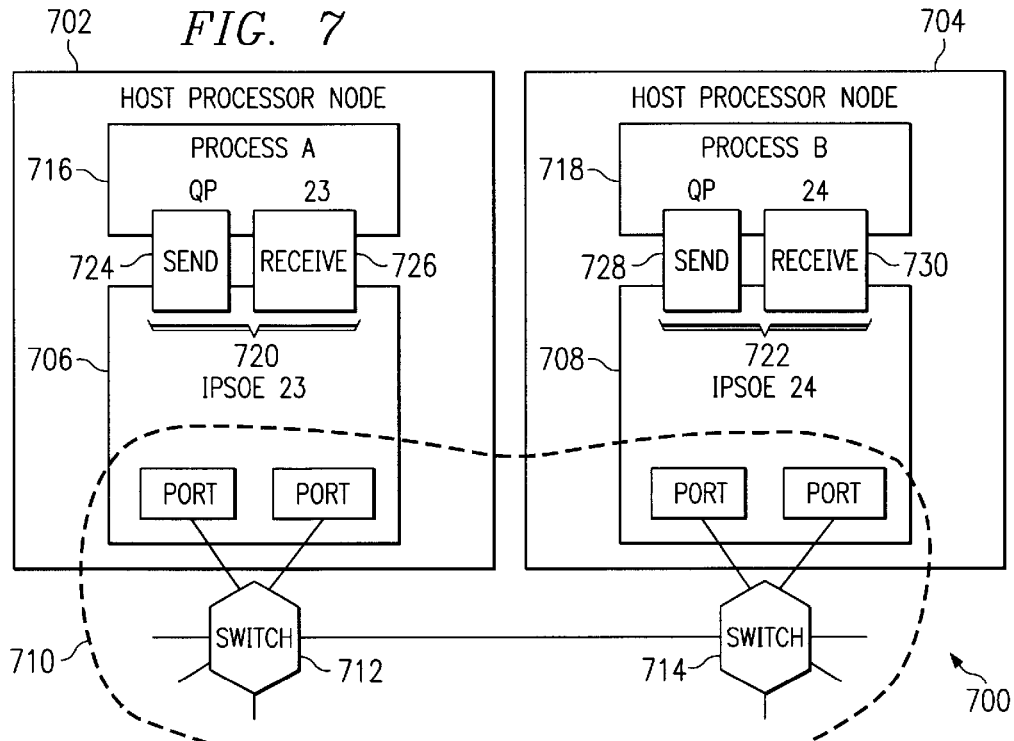
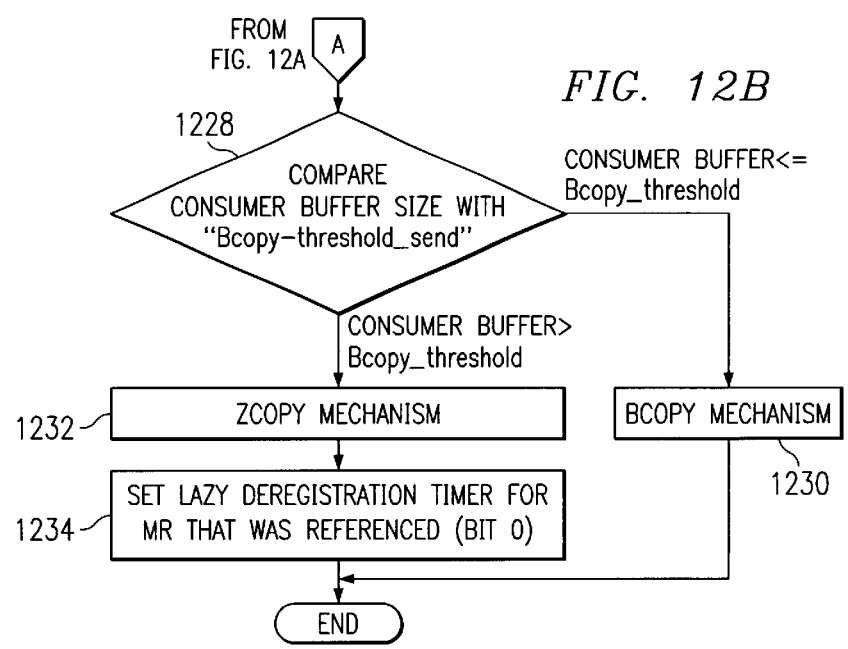

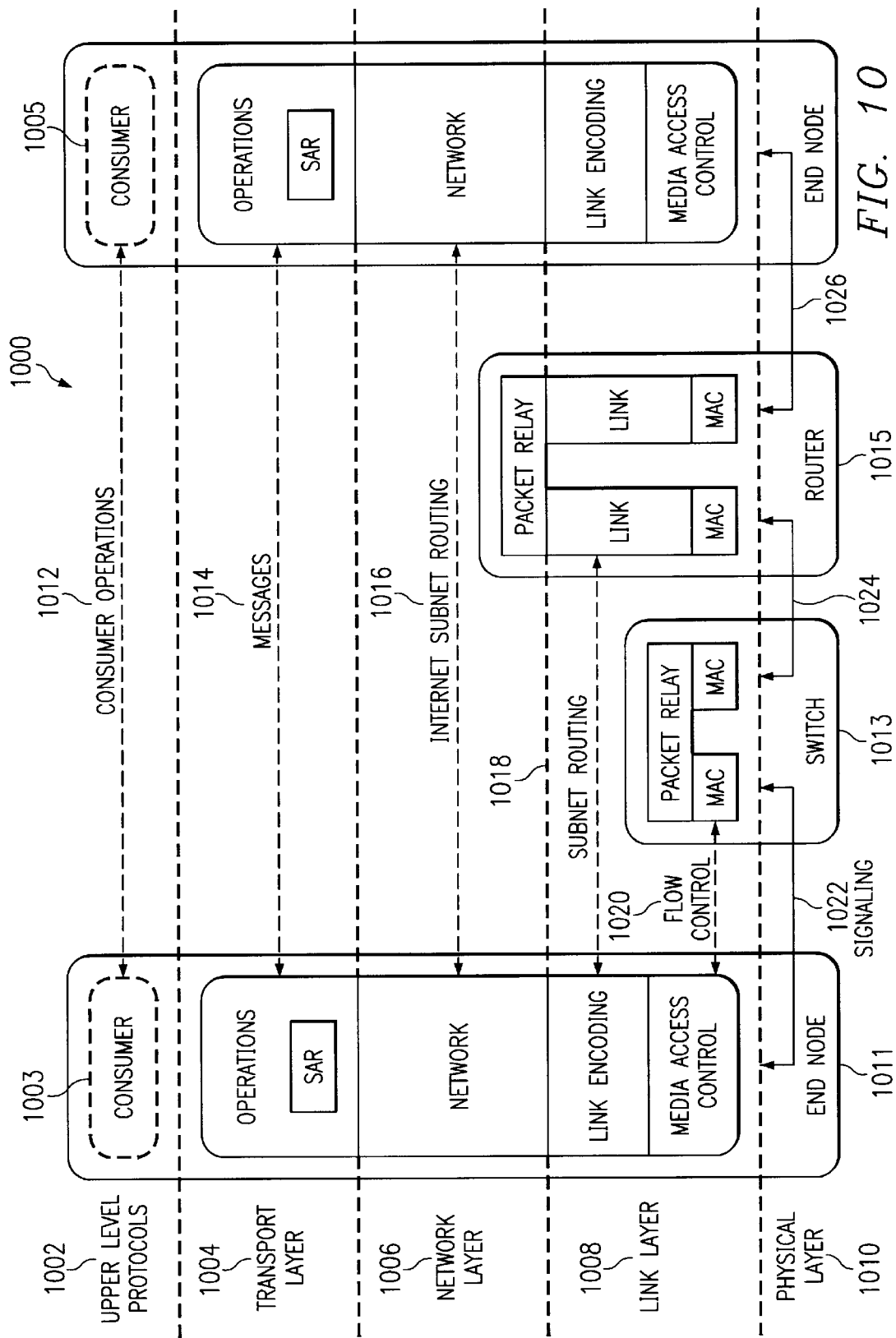

LAZY DEREGISTRATION PROTOCOL FOR A SPLIT SOCKET STACK

BACKGROUND OF THE INVENTION

1. Technical Field

The present invention relates generally to communication protocols between a host computer and an input/output (I/O) device. More specifically, the present invention provides a method by which previously registered memory can be reused through the use of a timer without requiring the registration of another memory region.

2. Description of Related Art

In an Internet Protocol (IP) Network, the software provides a message passing mechanism that can be used to communicate with input/output devices, general purpose computers (host), and special purpose computers. The message passing mechanism consists of a transport protocol, an upper level protocol, and an application programming interface. The key standard transport protocols used on IP networks today are the Transmission Control Protocol (TCP) and the User Datagram Protocol (UDP). TCP provides a reliable service and UDP provides an unreliable service. In the future the Stream Control Transmission Protocol (SCTP) will also be used to provide a reliable service. Processes executing on devices or computers access the IP network through upper level protocols, such as Sockets, iSCSI, and Direct Access File System (DAFS).

Unfortunately, the TCP/IP software consumes a considerable amount of processor and memory resources. This problem has been covered extensively in the literature (see J. Kay, J. Pasquale, "Profiling and reducing processing overheads in TCP/IP", IEEE/ACM Transactions on Networking, Vol 4, No. 6, pp.817–828, December 1996; and D. D. Clark, V. Jacobson, J. Romkey, H. Salwen, "An analysis of TCP processing overhead", IEEE Communications Magazine, volume: 27, Issue: 6, June 1989, pp 23–29). In the future the network stack will continue to consume excessive resources for several reasons, including: increased use of networking by applications; use of network security protocols; and the underlying fabric bandwidths are increasing at a higher rate than microprocessor and memory bandwidths. To address this problem the industry is offloading the network stack processing to an IP Suite Offload Engine (IPSOE).

There are two offload approaches being taken in the industry. The first approach uses the existing TCP/IP network stack, without adding any additional protocols. This approach can offload TCP/IP to hardware, but unfortunately does not remove the need for receive side copies. As noted in the papers above, copies are one of the largest contributors to central processing unit (CPU) utilization. To remove the need for copies, the industry is pursuing the second approach that consists of adding Framing, Direct Data Placement (DDP), and Remote Direct Memory Access (RDMA) over the TCP and SCTP protocols. The IP Suite Offload Engine (IPSOE) required to support these two approaches is similar, the key difference being that in the second approach the hardware must support the additional protocols.

The IPSOE provides a message passing mechanism that can be used by sockets, iSCSI, and DAFS to communicate between nodes. Processes executing on host computers, or devices, access the IP network by posting send/receive messages to send/receive work queues on an IPSOE. These processes also are referred to as "consumers".

The send/receive work queues (WQ) are assigned to a consumer as a queue pair (QP). The messages can be sent over four different transport types: traditional TCP, RDMA TCP, UDP, or SCTP. Consumers retrieve the results of these messages from a completion queue (CQ) through IPSOE send and receive work completion (WC) queues. The source IPSOE takes care of segmenting outbound messages and sending them to the destination. The destination IPSOE takes care of reassembling inbound messages and placing the inbound messages in the memory space designated by the destination's consumer. These consumers use IPSOE verbs to access the functions supported by the IPSOE. The software that interprets verbs and directly accesses the IPSOE is known as the IPSO interface (IPSOI).

Today, the host CPU performs most IP suite processing. IP Suite Offload Engines offer a higher performance interface for communicating to other general purpose computers and I/O devices. Data sends or receives through the IPSOE require that the CPU either copy data from one memory location to another or register the memory so that the IPSOE can directly access the memory region. Each of these options requires significant CPU resources with the memory registration option being preferred for large memory transfers; however, as network speeds increase the amount of CPU resources required will increase. It would be advantageous to have an improved method, apparatus, and computer instructions for reducing the amount of CPU resources required to register these memory locations.

SUMMARY OF THE INVENTION

The present invention provides a method, computer program product, and distributed data processing system for lazy deregistration of memory regions. Specifically, the present invention is directed to memory regions that are written to and from by an Integrated Protocol Suite Offload Engine (IPSOE) in accordance with a preferred embodiment of the present invention. A mechanism is provided for lazy deregistration of memory regions once the region is no longer required for a specific data transfer being carried out by the IPSOE. Rather than deregistering a memory region after a data transfer has been carried out, the memory region remains registered for some selected period of time. After that selected period of time passes, the region is then deregistered. If a second data transfer using this memory region occurs while the memory region is still registered, the registration overhead is avoided for this second data transfer. This mechanism reduces the amount of CPU resources required for transferring data by allowing reuse of previously registered memory regions.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 5 is a diagram illustrating a portion of a distributed computer system in accordance with a preferred embodiment of the present invention in which a TCP or SCTP transport is used;

FIG. 6 is an illustration of a data frame in accordance with a preferred embodiment of the present invention;

FIG. 7 is a diagram illustrating a portion of a distributed computer system to illustrate an example request and acknowledgment transaction in accordance with a preferred embodiment of the present invention;

FIG. 10 is a diagram of a layered communication architecture used in a preferred embodiment of the present invention;

FIGS. 12A and 12B are a flowchart for an algorithm to select between the Bcopy or the Zcopy functions for initial data transfers in accordance with a preferred embodiment of the present invention.

DETAILED DESCRIPTION OF THE PREFERRED EMBODIMENT

The present invention provides a distributed computing system having endnodes, switches, routers, and links interconnecting these components. The endnodes can be Internet Protocol Suite Offload Engines or traditional host software based Internet protocol suites. Each endnode uses send and receive queue pairs to transmit and receive messages. The endnodes segment the message into frames and transmit the frames over the links. The switches and routers interconnect the endnodes and route the frames to the appropriate endnode. The endnodes reassemble the frames into a message at the destination.

Figure 1:
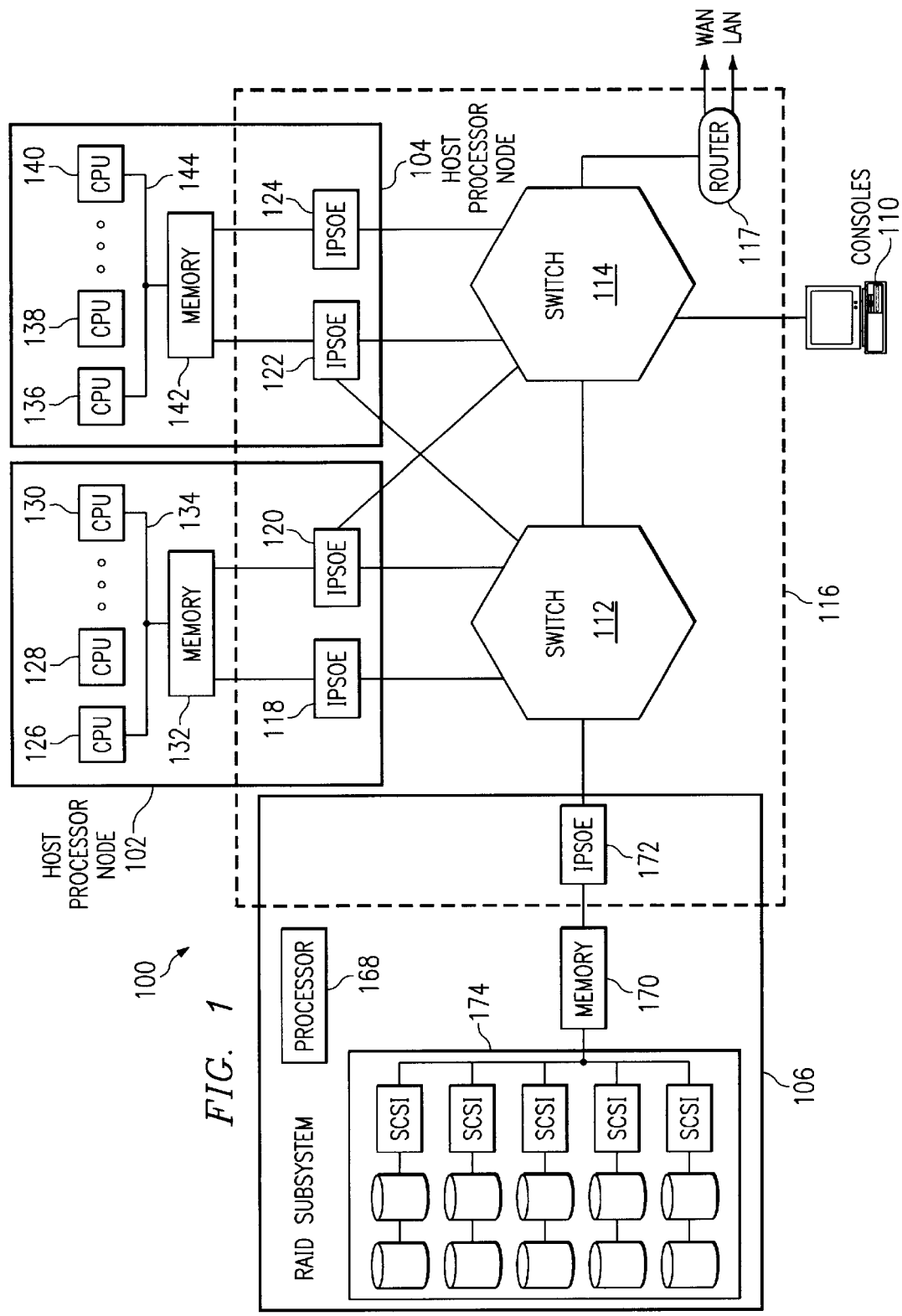
FIG. 1 is a diagram of a distributed computer system illustrated in accordance with a preferred embodiment of the present invention.

With reference now to the figures and in particular with reference to FIG. 1, a diagram of a distributed computer system is illustrated in accordance with a preferred embodiment of the present invention. The distributed computer system represented in FIG. 1 takes the form of an Internet protocol network (IP net), such as IP net 100, and is provided merely for illustrative purposes, and the embodiments of the present invention described below can be implemented on computer systems of numerous other types and configurations. For example, computer systems implementing the present invention can range from a small server with one processor and a few input/output (I/O) adapters to massively parallel supercomputer systems with hundreds or thousands of processors and thousands of I/O adapters. Furthermore, the present invention can be implemented in an infrastructure of remote computer systems connected by an Internet or intranet.

IP net 100 is a high-bandwidth, low-latency network interconnecting nodes within the distributed computer system. A node is any component attached to one or more links of a network and forming the origin and/or destination of messages within the network. In the depicted example, IP net 100 includes nodes in the form of host processor node 102, host processor node 104, and redundant array independent disk (RAID) subsystem node 106. The nodes illustrated in FIG. 1 are for illustrative purposes only, as IP net 100 can connect any number and any type of independent processor nodes, storage nodes, and special purpose processing nodes. Any one of the nodes can function as an endnode, which is herein defined to be a device that originates or finally consumes messages or frames in IP net 100.

In one embodiment of the present invention, an error handling mechanism in distributed computer systems is present in which the error handling mechanism allows for TCP or SCTP communication between endnodes in a distributed computing system, such as IP net 100.

A message, as used herein, is an application-defined unit of data exchange, which is a primitive unit of communication between cooperating processes. A frame is one unit of data encapsulated by Internet Protocol Suite headers and/or trailers. The headers generally provide control and routing information for directing the frame through IP net 100. The trailer generally contains control and cyclic redundancy check (CRC) data for ensuring frames are not delivered with corrupted contents.

Within a distributed computer system, IP net 100 contains the communications and management infrastructure supporting various forms of traffic, such as storage, interprocess communications (IPC), file access, and sockets. IP net 100 shown in FIG. 1 includes a switched communications fabric 116, which allows many devices to concurrently transfer data with high-bandwidth and low-latency in a secure, remotely managed environment. Endnodes can communicate over multiple ports and can utilize multiple paths through the IP net fabric. The multiple ports and paths through the IP net shown in FIG. 1 can be employed for fault tolerance and increased bandwidth data transfers. Access to components in switched communications fabric 116, for administration and maintenance, may occur through consoles 110.

The IP net 100 in FIG. 1 includes switch 112, switch 114, and router 117. A switch is a device that connects multiple links together and allows routing of frames from one link to another link using the layer 2 destination address field. When the Ethernet is used as the link, the destination field is known as the media access control (MAC) address. A router is a device that routes frames based on the layer 3 destination address field. When Internet Protocol (IP) is used as the layer 3 protocol, the destination address field is an IP address.

In one embodiment, a link is a full duplex channel between any two network fabric elements, such as endnodes, switches, or routers. Example suitable links include, but are not limited to, copper cables, optical cables, and printed circuit copper traces on backplanes and printed circuit boards.

For reliable service types (TCP and SCTP), endnodes, such as host processor endnodes and I/O adapter endnodes, generate request frames and return acknowledgment frames. Switches and routers pass frames along, from the source to the destination.

In IP net 100 as illustrated in FIG. 1, host processor node 102, host processor node 104, and RAID subsystem node 106 include at least one IPSOE to interface to IP net 100. In one embodiment, each IPSOE is an endpoint that implements the IPSOI in sufficient detail to source or sync frames transmitted on IP net 100. Host processor node 102 contains IPSOEs in the form of host IPSOE 118 and IPSOE 120. Host processor node 104 contains IPSOE 122 and IPSOE 124. Host processor node 102 also includes central processing units 126–130 and a memory 132 interconnected by bus system 134. Host processor node 104 similarly includes central processing units 136–140 and a memory 142 interconnected by a bus system 144.

IPSOE 118 provides a connection to switch 112, while IPSOE 124 provides a connection to switch 114, and IPSOEs 120 and 122 provide a connection to switches 112 and 114.

In one embodiment, an IP Suite Offload Engine is implemented in hardware or a combination of hardware and offload microprocessor(s). In this implementation, IP suite processing is offloaded to the IPSOE. This implementation also permits multiple concurrent communications over a switched network without the traditional overhead associated with communicating protocols. In one embodiment, the IPSOEs and IP net 100 in FIG. 1 provide the consumers of the distributed computer system with zero processor-copy data transfers without involving the operating system kernel process, and employs hardware to provide reliable, fault tolerant communications.

As indicated in FIG. 1, router 117 is coupled to wide area network (WAN) and/or local area network (LAN) connections to other hosts or other routers. In this example, RAID subsystem node 106 in FIG. 1 includes processor 168, memory 170, IP Suite Offload Engine (IPSOE) 172, and multiple redundant and/or striped storage disk unit 174.

IP net 100 handles data communications for storage, interprocessor communications, file accesses, and sockets. IP net 100 supports high-bandwidth, scalable, and extremely low-latency communications. User clients can bypass the operating system kernel process and directly access network communication components, such as IPSOEs, which enable efficient message passing protocols. IP net 100 is suited to current computing models and is a building block for new forms of storage, cluster, and general networking communication. Further, IP net 100 in FIG. 1 allows storage nodes to communicate among themselves or to communicate with any or all of the processor nodes in a distributed computer system. With storage attached to IP net 100, the storage node has substantially the same communication capability as any host processor node in IP net 100.

In one embodiment, the IP net 100 shown in FIG. 1 supports channel semantics and memory semantics. Channel semantics is sometimes referred to as send/receive or push communication operations. Channel semantics are the type of communications employed in a traditional I/O channel where a source device pushes data and a destination device determines a final destination of the data. In channel semantics, the frame transmitted from a source process specifies a destination processes' communication port, but does not specify where in the destination processes' memory space the frame will be written. Thus, in channel semantics, the destination process pre-allocates where to place the transmitted data.

In memory semantics, a source process directly reads or writes the virtual address space of a remote node destination process. The remote destination process need only communicate the location of a buffer for data, and does not need to be involved in the transfer of any data. Thus, in memory semantics, a source process sends a data frame containing the destination buffer memory address of the destination process. In memory semantics, the destination process previously grants permission for the source process to access its memory.

Channel semantics and memory semantics are typically both necessary for storage, cluster, and general networking communications. A typical storage operation employs a combination of channel and memory semantics. In an illustrative example storage operation of the distributed computer system shown in FIG. 1, a host processor node, such as host processor node 102, initiates a storage operation by using channel semantics to send a disk write command to the RAID subsystem IPSOE 172. The RAID subsystem examines the command and uses memory semantics to read the data buffer directly from the memory space of the host processor node. After the data buffer is read, the RAID subsystem employs channel semantics to push an I/O completion message back to the host processor node.

In one exemplary embodiment, the distributed computer system shown in FIG. 1 performs operations that employ virtual addresses and virtual memory protection mechanisms to ensure correct and proper access to all memory. Applications running in such a distributed computer system are not required to use physical addressing for any operations.

Figure 2:
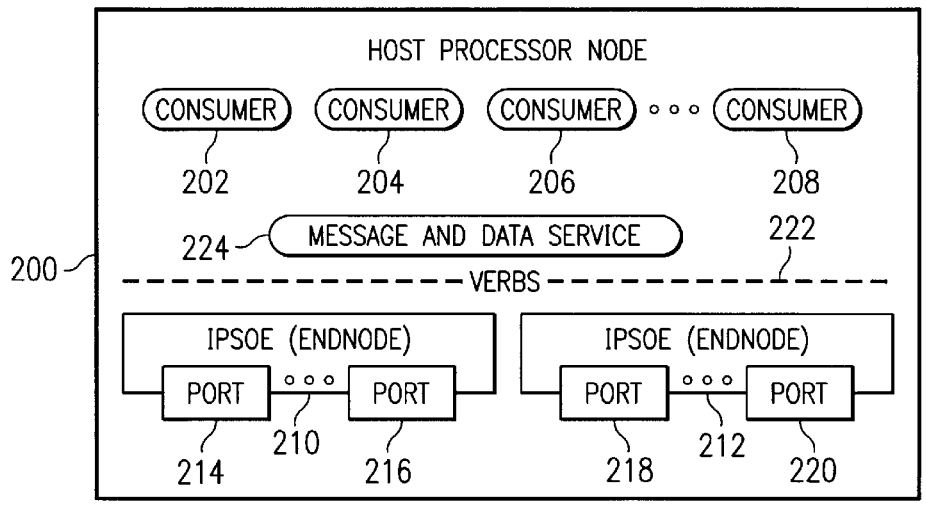
FIG. 2 is a functional block diagram of a host processor node in accordance with a preferred embodiment of the present invention.

Turning next to FIG. 2, a functional block diagram of a host processor node is depicted in accordance with a preferred embodiment of the present invention. Host processor node 200 is an example of a host processor node, such as host processor node 102 in FIG. 1. In this example, host processor node 200, shown in FIG. 2, includes a set of consumers 202–208, which are processes executing on host processor node 200. Host processor node 200 also includes IP Suite Offload Engine (IPSOE) 210 and IPSOE 212. IPSOE 210 contains ports 214 and 216 while IPSOE 212 contains ports 218 and 220. Each port connects to a link. The ports can connect to one IP net subnet or multiple IP net subnets, such as IP net 100 in FIG. 1.

Consumers 202–208 transfer messages to the IP net via the verbs interface 222 and message and data service 224. A verbs interface is essentially an abstract description of the functionality of an IP Suite Offload Engine. An operating system may expose some or all of the verb functionality through its programming interface. Basically, this interface defines the behavior of the host. Additionally, host processor node 200 includes a message and data service 224, which is a higher-level interface than the verb layer and is used to process messages and data received through IPSOE 210 and IPSOE 212. Message and data service 224 provides an interface to consumers 202–208 to process messages and other data.

Figure 3A:
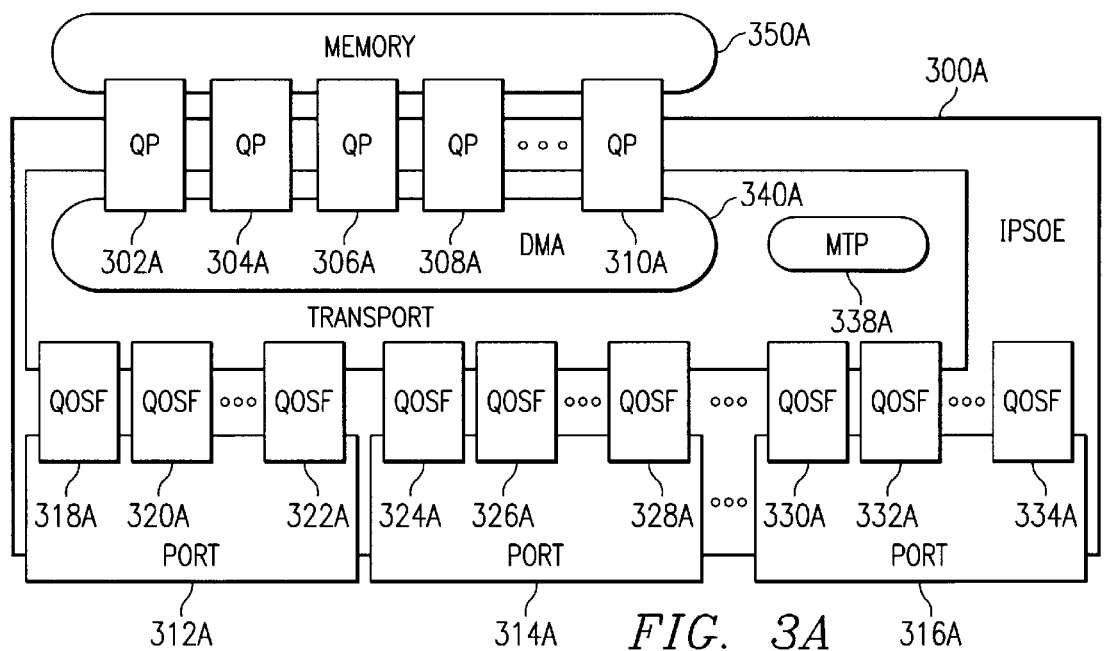
FIG. 3A is a diagram of an IP Suite Offload Engine in accordance with a preferred embodiment of the present invention.

With reference now to FIG. 3A, a diagram of an IP Suite Offload Engine is depicted in accordance with a preferred embodiment of the present invention. IP Suite Offload Engine 300A shown in FIG. 3A includes a set of queue pairs (QPs) 302A–310A, which are used to transfer messages to the IPSOE ports 312A–316A. Buffering of data to IPSOE ports 312A–316A is channeled using the network layer's quality of service field (QOSF), for example, the Traffic Class field in the IP Version 6 specification, 318A–334A. Each network layer quality of service field has its own flow control. Internet Engineering Task Force (IETF) standard network protocols are used to configure the link and network addresses of all IP Suite Offload Engine ports connected to the network. Two such protocols are Address Resolution Protocol (ARP) and Dynamic Host Configuration Protocol. Memory translation and protection (MTP) 338A is a mechanism that translates virtual addresses to physical addresses and validates access rights. Direct memory access (DMA) 340A provides for direct memory access operations using memory 350A with respect to queue pairs 302A–310A.

A single IP Suite Offload Engine, such as IPSOE 300A shown in FIG. 3A, can support thousands of queue pairs. Each queue pair consists of a send work queue (SWQ) and a receive work queue (RWQ). The send work queue is used to send channel and memory semantic messages. The receive work queue receives channel semantic messages. A consumer calls an operating system specific programming interface, which is herein referred to as "verbs", to place work requests (WRs) onto a work queue.

Figure 3B:
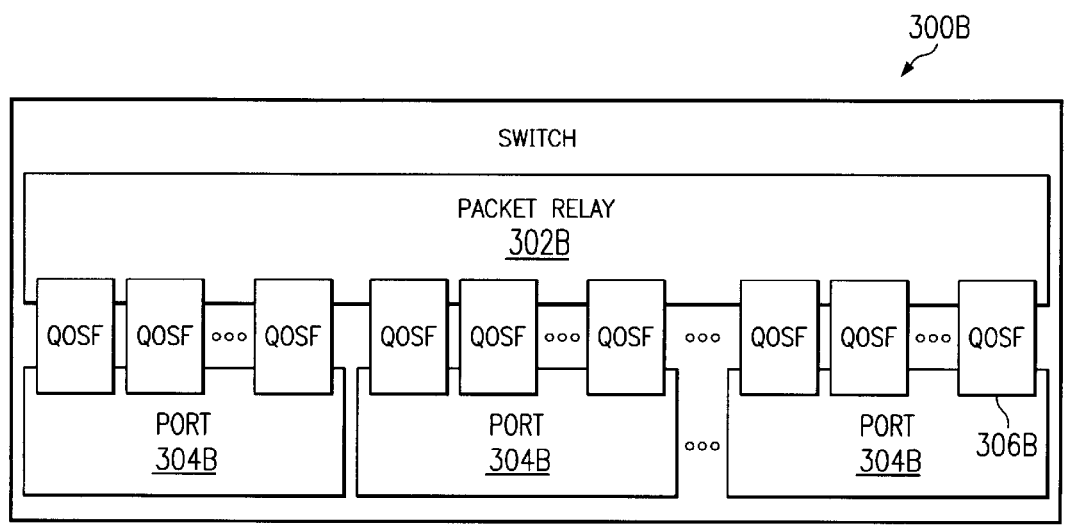
FIG. 3B is a diagram of a switch in accordance with a preferred embodiment of the present invention.

FIG. 3B depicts a switch, such as switch 300B, in accordance with a preferred embodiment of the present invention. Switch 300B includes a packet relay 302B in communication with a number of ports 304B through link or network layer quality of service fields such as IP version 4's Type of Service field, identified as QOSF 306B. Generally, a switch such as switch 300B can route frames from one port to any other port on the same switch.

Figure 3C:
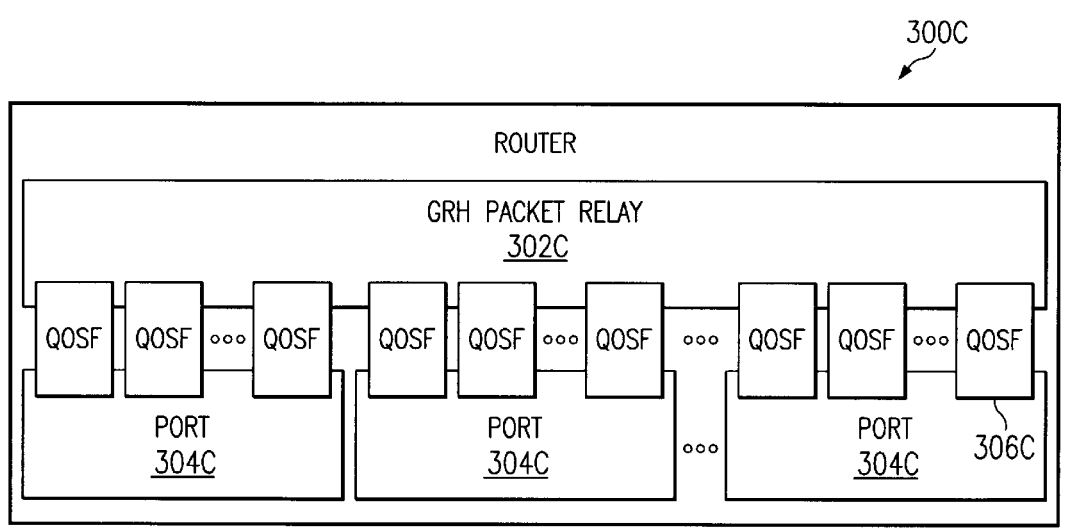
FIG. 3C is a diagram of a router in accordance with a preferred embodiment of the present invention.

Similarly, FIG. 3C depicts a router 300C in accordance with a preferred embodiment of the present invention. Router 300C includes a frame relay, such as GRH packet relay 302C in communication with a number of ports 304C through network layer quality of service fields such as IP version 4's Type of Service field, identified as QOSF 306C. Like switch 300B, router 300C will generally be able to route frames from one port to any other port on the same router.

Figure 4:
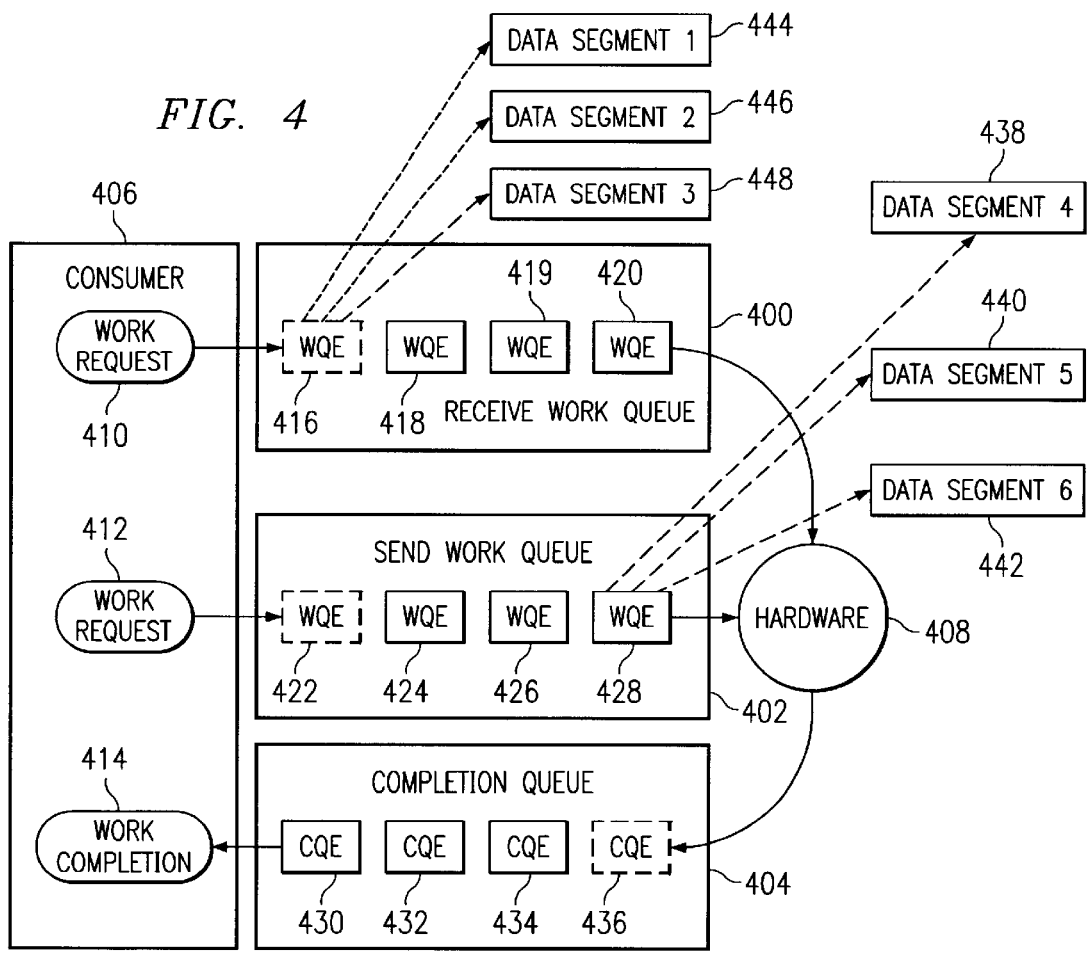
FIG. 4 is a diagram illustrating processing of work requests in accordance with a preferred embodiment of the present invention.

With reference now to FIG. 4, a diagram illustrating processing of work requests is depicted in accordance with a preferred embodiment of the present invention. In FIG. 4, a receive work queue 400, send work queue 402, and completion queue 404 are present for processing requests from and for consumer 406. These requests from consumer 406 are eventually sent to hardware 408. In this example, consumer 406 generates work requests 410 and 412 and receives work completion 414. As shown in FIG. 4, work requests placed onto a work queue are referred to as work queue elements (WQEs).

Send work queue 402 contains work queue elements (WQEs) 422–428, describing data to be transmitted on the IP net fabric. Receive work queue 400 contains work queue elements (WQEs) 416–420, describing where to place incoming channel semantic data from the IP net fabric. A work queue element is processed by hardware 408 in the IPSOE.

The verbs also provide a mechanism for retrieving completed work from completion queue 404. As shown in FIG. 4, completion queue 404 contains completion queue elements (CQEs) 430–436. Completion queue elements contain information about previously completed work queue elements. Completion queue 404 is used to create a single point of completion notification for multiple queue pairs. A completion queue element is a data structure on a completion queue. This element describes a completed work queue element. The completion queue element contains sufficient information to determine the queue pair and specific work queue element that completed. A completion queue context is a block of information that contains pointers to, length, and other information needed to manage the individual completion queues.

Example work requests supported for send work queue 402 shown in FIG. 4 are as follows. A send work request is a channel semantic operation to push a set of local data segments to the data segments referenced by a remote node's receive work queue element. For example, work queue element 428 contains references to data segment 4 438, data segment 5 440, and data segment 6 442. Each of the send work request's data segments contains part of a virtually contiguous memory region. The virtual addresses used to reference the local data segments are in the address context of the process that created the local queue pair.

A remote direct memory access (RDMA) read work request provides a memory semantic operation to read a virtually contiguous memory space on a remote node. A memory space can either be a portion of a memory region or portion of a memory window. A memory region references a previously registered set of virtually contiguous memory addresses defined by a virtual address and length. A memory window references a set of virtually contiguous memory addresses that have been bound to a previously registered region.

The RDMA read work request reads a virtually contiguous memory space on a remote endnode and writes the data to a virtually contiguous local memory space. Similar to the send work request, virtual addresses used by the RDMA read work queue element to reference the local data segments are in the address context of the process that created the local queue pair. The remote virtual addresses are in the address context of the process owning the remote queue pair targeted by the RDMA read work queue element.

A RDMA write work queue element provides a memory semantic operation to write a virtually contiguous memory space on a remote node. For example, work queue element 416 in receive work queue 400 references data segment 1 444, data segment 2 446, and data segment 3 448. The RDMA write work queue element contains a scatter list of local virtually contiguous memory spaces and the virtual address of the remote memory space into which the local memory spaces are written.

A RDMA FetchOp work queue element provides a memory semantic operation to perform an atomic operation on a remote word. The RDMA FetchOp work queue element is a combined RDMA Read, Modify, and RDMA Write operation. The RDMA FetchOp work queue element can support several read-modify-write operations, such as Compare and Swap if equal. The RDMA FetchOp is not included in current RDMA over IP standardization efforts, but is described here, because it may be used as a value-added feature in some implementations.

A bind (unbind) remote access key (R_Key) work queue element provides a command to the IP Suite Offload Engine hardware to modify (destroy) a memory window by associating (disassociating) the memory window to a memory region. The R_Key is part of each RDMA access and is used to validate that the remote process has permitted access to the buffer.

In one embodiment, receive work queue 400 shown in FIG. 4 only supports one type of work queue element, which is referred to as a receive work queue element. The receive work queue element provides a channel semantic operation describing a local memory space into which incoming send messages are written. The receive work queue element includes a scatter list describing several virtually contiguous memory spaces. An incoming send message is written to these memory spaces. The virtual addresses are in the address context of the process that created the local queue pair.

For interprocessor communications, a user-mode software process transfers data through queue pairs directly from where the buffer resides in memory. In one embodiment, the transfer through the queue pairs bypasses the operating system and consumes few host instruction cycles. Queue pairs permit zero processor-copy data transfer with no operating system kernel involvement. The zero processor-copy data transfer provides for efficient support of high-bandwidth and low-latency communication.

When a queue pair is created, the queue pair is set to provide a selected type of transport service. In one embodiment, a distributed computer system implementing the present invention supports three types of transport services: TCP, SCTP, and UDP.

TCP and SCTP associate a local queue pair with one and only one remote queue pair. TCP and SCTP require a process to create a queue pair for each process that TCP and SCTP are to communicate with over the IP net fabric. Thus, if each of N host processor nodes contains P processes, and all P processes on each node wish to communicate with all the processes on all the other nodes, each host processor node requires $P^2 \times (N-1)$ queue pairs. Moreover, a process can associate a queue pair to another queue pair on the same IPSOE.

A portion of a distributed computer system employing TCP or SCTP to communicate between distributed processes is illustrated generally in FIG. 5. Distributed computer system 500 in FIG. 5 includes a host processor node 1, a host processor node 2, and a host processor node 3. Host processor node 1 includes a process A 510. Host processor node 3 includes a process C 520 and a process D 530. Host processor node 2 includes a process E 540. Host processor node 1 includes queue pairs 4, 6 and 7, each having a send work queue and receive work queue. Host processor node 2 has a queue pair 9 and host processor node 3 has queue pairs 2 and 5. The TCP or SCTP of distributed computer system 500 associates a local queue pair with one and only one remote queue pair. Thus, the queue pair 4 is used to communicate with queue pair 2; queue pair 7 is used to communicate with queue pair 5; and queue pair 6 is used to communicate with queue pair 9.

A WQE placed on one send queue in a TCP or SCTP causes data to be written into the receive memory space referenced by a receive WQE of the associated queue pair. RDMA operations operate on the address space of the associated queue pair.

In one embodiment of the present invention, the TCP or SCTP is made reliable because hardware maintains sequence numbers and acknowledges all frame transfers. A combination of hardware and IP net driver software retries any failed communications. The process client of the queue pair obtains reliable communications even in the presence of bit errors, receive underruns, and network congestion. If alternative paths exist in the IP net fabric, reliable communications can be maintained even in the presence of failures of fabric switches, links, or IP Suite Offload Engine ports.

In addition, acknowledgements may be employed to deliver data reliably across the IP net fabric. The acknowledgement may, or may not, be a process level acknowledgement, i.e. an acknowledgement that validates that a receiving process has consumed the data. Alternatively, the acknowledgement may be one that only indicates that the data has reached its destination.

The User Datagram Protocol is connectionless. The UDP is employed by management applications to discover and integrate new switches, routers, and endnodes into a given distributed computer system. The UDP does not provide the reliability guarantees of the TCP or SCTP. The UDP accordingly operates with less state information maintained at each endnode.

Turning next to FIG. 6, an illustration of a data frame is depicted in accordance with a preferred embodiment of the present invention. A data frame is a unit of information that is routed through the IP net fabric. The data frame is an endnode-to-endnode construct, and is thus created and consumed by endnodes. For frames destined to an IPSOE, the data frames are neither generated nor consumed by the switches and routers in the IP net fabric. Instead for data frames that are destined to an IPSOE, switches and routers simply move request frames or acknowledgment frames closer to the ultimate destination, modifying the link header fields in the process. Routers may modify the frame's network header when the frame crosses a subnet boundary. In traversing a subnet, a single frame stays on a single service level.

Message data 600 contains data segment 1 602, data segment 2 604, and data segment 3 606, which are similar to the data segments illustrated in FIG. 4. In this example, these data segments form a frame 608, which is placed into frame payload 610 within data frame 612. Additionally, data frame 612 contains cyclic redundancy check (CRC) 614, which is used for error checking. Additionally, routing header 616 and transport header 618 are present in data frame 612. Routing header 616 is used to identify source and destination ports for data frame 612. Transport header 618 in this example specifies the sequence number and the source and destination port number for data frame 612. The sequence number is initialized when communication is established and increments by 1 for each byte of frame header, DDP/RDMA header, data payload, and CRC. Frame header 620 in this example specifies the destination queue pair number associated with the frame and the length of the Direct Data Placement and/or Remote Direct Memory Access (DDP/RDMA) header plus data payload plus CRC. DDP/RDMA header 622 specifies the message identifier and the placement information for the data payload. The message identifier is constant for all frames that are part of a message. Example message identifiers include, for example, send, write RDMA, and read RDMA.

In FIG. 7, a portion of a distributed computer system, such as distributed computer system 700 is depicted to illustrate an example request and acknowledgment transaction. Distributed computer system 700 in FIG. 7 includes a host processor node 702 running process A 716 and a host processor node 704 running process B 718. Host processor node 702 includes an IPSOE 706. Host processor node 704 includes an IPSOE 708. The distributed computer system in FIG. 7 includes IP net fabric 710, which includes switch 712 and switch 714. The IP net fabric includes a link coupling IPSOE 706 to switch 712; a link coupling switch 712 to switch 714; and a link coupling IPSOE 708 to switch 714.

In the example transactions, host processor node 702 includes a client process A. Host processor node 704 includes a client process B. Client process A interacts with host IPSOE 706 through queue pair 23 720 comprising send queue 724 and receive queue 726. Client process B interacts with host IPSOE 708 through queue pair 24 722 comprising send queue 728 and receive queue 730. Queue pairs 23 and 24 are data structures that include a send work queue and a receive work queue.

Process A initiates a message request by posting work queue elements to the send queue of queue pair 23. Such a work queue element is illustrated in FIG. 4. The message request of client process A is referenced by a gather list contained in the send work queue element. Each data segment in the gather list points to part of a virtually contiguous local memory region, which contains a part of the message, such as indicated by data segments 1, 2, and 3, which respectively hold message parts 1, 2, and 3, in FIG. 4.

Hardware in host IPSOE 706 reads the work queue element and segments the message stored in virtual contiguous buffers into data frames, such as the data frame illustrated in FIG. 6. Data frames are routed through the IP net fabric, and for reliable transfer services, are acknowledged by the final destination endnode. If not successfully acknowledged, the data frame is retransmitted by the source endnode. Data frames are generated by source endnodes and consumed by destination endnodes.

Figure 8:
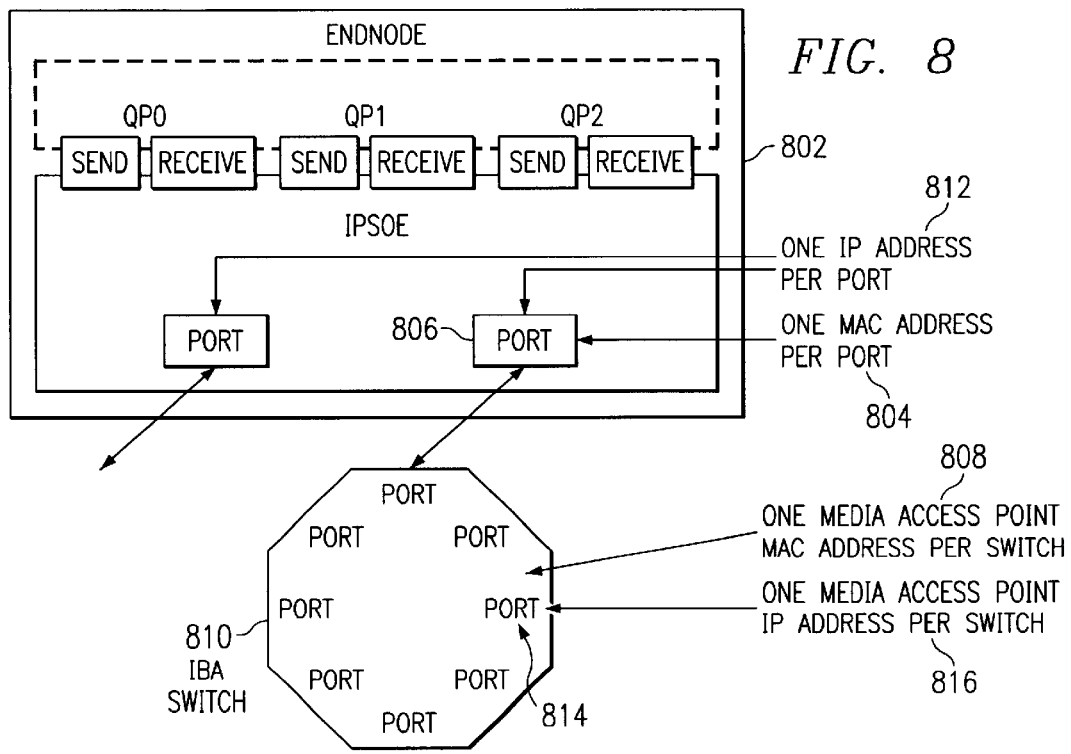
FIG. 8 is a diagram illustrating the network addressing used in a distributed networking system in accordance with the present invention.

With reference to FIG. 8, a diagram illustrating the network addressing used in a distributed networking system is depicted in accordance with the present invention. A host name provides a logical identification for a host node, such as a host processor node or I/O adapter node. The host name identifies the endpoint for messages such that messages are destined for processes residing on an endnode specified by the host name. Thus, there is one host name per node, but a node can have multiple IPSOEs.

A single link layer address (e.g. Ethernet Media Access Layer Address) 804 is assigned to each port 806 of an endnode component 802. A component can be an IPSOE, switch, or router. All IPSOE and router components must have a MAC address. A media access point on a switch is also assigned a MAC address.

One network address (e.g. IP Address) 812 is assigned to each port 806 of an endnode component 802. A component can be an IPSOE, switch, or router. All IPSOE and router components must have a network address. A media access point on a switch is also assigned a MAC address.

Figure 9:
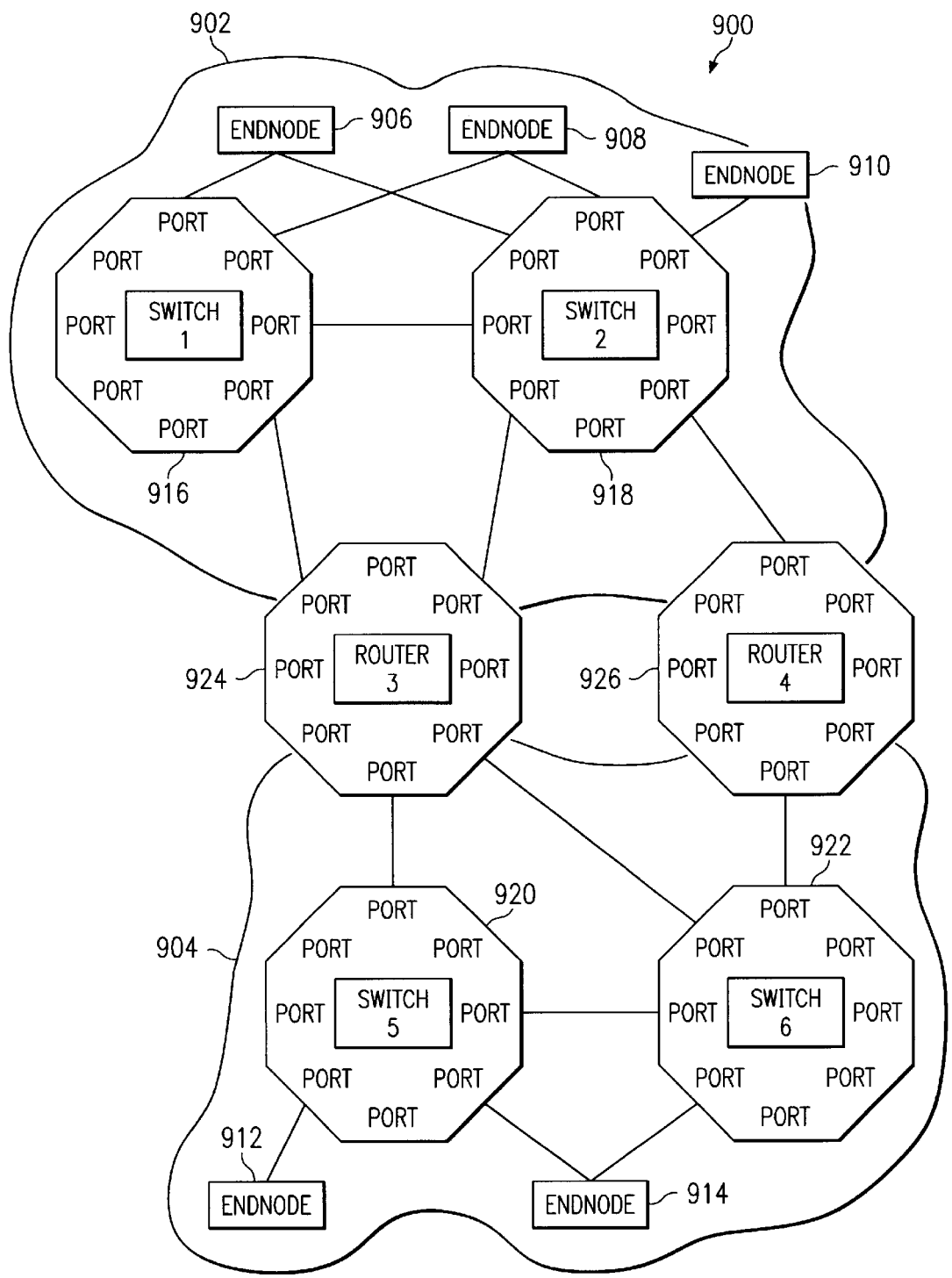
FIG. 9 is a diagram of a portion of a distributed computer system containing subnets in a preferred embodiment of the present invention.

Each port of switch 810 does not have a link layer address associated with it. However, switch 810 can have a media access port 814 that has a link layer address 816 and a network layer address 808 associated with it. A portion of a distributed computer system in accordance with a preferred embodiment of the present invention is illustrated in FIG. 9. Distributed computer system 900 includes a subnet 902 and a subnet 904. Subnet 902 includes endnodes, such as host processor nodes 906, 908, and 910. Subnet 904 includes endnodes, such as host processor nodes 912 and 914. Subnet 902 includes switches 916 and 918. Subnet 904 includes switches 920 and 922.

Routers create and connect subnets. For example, subnet 902 is connected to subnet 904 with routers 924 and 926. In one example embodiment, a subnet has up to 216 endnodes, switches, and routers.

A subnet is defined as a group of endnodes and cascaded switches that is managed as a single unit. Typically, a subnet occupies a single geographic or functional area. For example, a single computer system in one room could be defined as a subnet. In one embodiment, the switches in a subnet can perform very fast wormhole or cut-through routing for messages.

A switch within a subnet examines the destination link layer address (e.g. MAC address) that is unique within the subnet to permit the switch to quickly and efficiently route incoming message frames. In one embodiment, the switch is a relatively simple circuit, and is typically implemented as a single integrated circuit. A subnet can have hundreds to thousands of endnodes formed by cascaded switches.

As illustrated in FIG. 9, for expansion to much larger systems, subnets are connected with routers, such as routers 924 and 926. The router interprets the destination network layer address (e.g. IP address) and routes the frame.

An example embodiment of a switch is illustrated generally in FIG. 3B. Each I/O path on a switch or router has a port. Generally, a switch can route frames from one port to any other port on the same switch. Within a subnet, such as subnet 902 or subnet 904, a path from a source port to a destination port is determined by the link layer address (e.g. MAC address) of the destination host IPSOE port. Between subnets, a path is determined by the network layer address (IP address) of the destination IPSOE port and by the link layer address (e.g. MAC address) of the router port, which will be used to reach the destination's subnet.

In one embodiment, the paths used by the request frame and the request frame's corresponding positive acknowledgment (ACK) frame are not required to be symmetric. In one embodiment employing oblivious routing, switches select an output port based on the link layer address (e.g. MAC address). In one embodiment, a switch uses one set of routing decision criteria for all its input ports in the switch. In one example embodiment, the routing decision criteria are contained in one routing table. In an alternative embodiment, a switch employs a separate set of criteria for each input port.

A data transaction in the distributed computer system of the present invention is typically composed of several hardware and software steps. A client process data transport service can be a user-mode or a kernel-mode process. The client process accesses IP Suite Offload Engine hardware through one or more queue pairs, such as the queue pairs illustrated in FIGS. 3A, 5, and 8. The client process calls an operating system specific programming interface, which is herein referred to as "verbs." The software code implementing verbs posts a work queue element to the given queue pair work queue.

There are many possible methods of posting a work queue element and there are many possible work queue element formats, which allow for various cost/performance design points, but which do not affect interoperability. A user process, however, must communicate to verbs in a well-defined manner, and the format and protocols of data transmitted across the IP net fabric must be sufficiently specified to allow devices to interoperate in a heterogeneous vendor environment.

In one embodiment, IPSOE hardware detects work queue element postings and accesses the work queue element. In this embodiment, the IPSOE hardware translates and validates the work queue element's virtual addresses and accesses the data.

An outgoing message is split into one or more data frames. In one embodiment, the IPSOE hardware adds a DDP/RDMA header, frame header and CRC, transport header and a network header to each frame. The transport header includes sequence numbers and other transport information. The network header includes routing information, such as the destination IP address and other network routing information. The link header contains the destination link layer address (e.g. MAC address) or other local routing information.

If a TCP or SCTP is employed, when a request data frame reaches its destination endnode, acknowledgment data frames are used by the destination endnode to let the request data frame sender know the request data frame was validated and accepted at the destination. Acknowledgement data frames acknowledge one or more valid and accepted request data frames. The requester can have multiple outstanding request data frames before it receives any acknowledgments.

In one embodiment, the number of multiple outstanding messages, i.e. request data frames, is determined when a queue pair is created.

One embodiment of a layered architecture 1000 for implementing the present invention is generally illustrated in diagram form in FIG. 10. The layered architecture diagram of FIG. 10 shows the various layers of data communication paths, and organization of data and control information passed between layers.

IPSOE endnode protocol layers (employed by endnode 1011, for instance) include upper level protocols 1002 defined by consumer 1003, transport layer 1004; network layer 1006, link layer 1008, and physical layer 1010. Switch layers (employed by switch 1013, for instance) include link layer 1008 and physical layer 1010. Router layers (employed by router 1015, for instance) include network layer 1006, link layer 1008, and physical layer 1010.

Layered architecture 1000 generally follows an outline of a classical communication stack in order to complete consumer operations 1012 of transferring data between consumers 1003 and 1005. With respect to the protocol layers of endnode 1011, for example, upper level protocols 1002 employs verbs to create messages at transport layer 1004. Transport layer 1004 passes messages 1014 to network layer 1006. Network layer 1006 routes frames between network subnets 1016. Link layer 1008 routes frames within a network subnet 1018. Physical layer 1010 sends bits or groups of bits to the physical layers of other devices. Each of the layers is unaware of how the upper or lower layers perform their functionality. Consumers 1003 and 1005 represent applications or processes that employ the other layers for communicating between endnodes. Transport layer 1004 provides end-to-end message movement. In one embodiment, the transport layer provides four types of transport services as described above which are traditional TCP, RDMA over TCP, SCTP, and UDP. Network layer 1006 performs frame routing through a subnet or multiple subnets to destination endnodes. Link layer 1008 performs flow-controlled 1020, error checked, and prioritized frame delivery across links.

Physical layer 1010 performs technology-dependent bit transmission. Bits or groups of bits are passed between physical layers via links 1022, 1024, and 1026. Links can be implemented with printed circuit copper traces, copper cable, optical cable, or with other suitable links.

Figure 11:
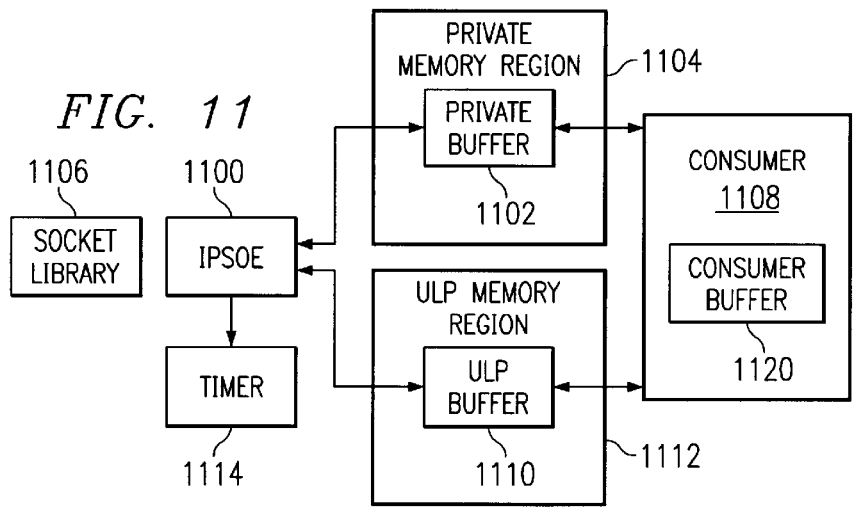
FIG. 11 is a diagram illustrating components used in transferring data in accordance with a preferred embodiment of the present invention.

Turning now to FIG. 11, a diagram illustrating components used in transferring data is depicted in accordance with a preferred embodiment of the present invention. In the context of the current invention, the two mechanisms for transferring data are Bcopy and Zcopy, which are well-known transfer mechanisms that utilize data buffers. The socket consumer uses these two mechanisms to transfer a consumer buffer through the IPSOE. A consumer buffer is an area of memory that the consumer wishes to transfer through the IPSOE, but may not be registered with the IPSOE. A private memory region is an area of memory that has been registered by the socket library for use in transferring registered private buffers. Finally, an Upper Layer Protocol (ULP) memory region is a subset of memory that has been registered by the socket library on behalf of the consumer for use in transferring registered ULP buffers. The socket library uses the socket driver to pin and register memory ensuring that all pages in the memory region are resident in memory.

The Bcopy mechanism will be used to transfer small consumer buffers, such as consumer buffer 1120, through IPSOE 1100 by copying data through a registered private buffer, such as registered private buffer 1102, which is a subset of the private memory region 1104, which may be located in a host memory, such as memory 132 in host processor node 102 or memory 142 in host processor node 104 in FIG. 1. In these examples, IPSOE 1100 is implemented as IPSOE 118 within host processor node 102 or as IPSOE 122 in host processor node 104 in FIG. 1. The private memory region is registered by a socket library, such as socket library 1106, when a Socket Open is invoked by the consumer. The private memory region cannot be accessed directly by a socket consumer, such as consumer 1108.

When IPSOE 1100 is executing a Receive command, the data will then be copied from registered private buffer 1102 into consumer buffer 1120 in the host processor node 102 and will then be made available for use by consumer 1108. When executing a Send command, the data is first copied from consumer buffer 1120 into registered private buffer 1102 and then transferred through IPSOE 118, in FIG. 1, across the network.

The Zcopy mechanism is used by the socket library for large data transfers. When consumer 1108 invokes a socket transfer call (e.g. Send or Receive), socket library 1106 determines if consumer buffer 1120 is large enough to warrant using the Zcopy mechanism. If it is, consumer buffer 1120 is pinned and registered with IPSOE 1100. The registration converts consumer buffer 1120 into a registered ULP buffer, such as registered ULP buffer 1110 that is in a memory region, such as ULP memory region 1112.

Presently, this registered ULP buffer 1110 is deregistered after the operation is completed. The present invention recognizes that this registered ULP buffer, ULP buffer 1110, may be reused in a subsequent data transfer. The Zcopy mechanism does not require a data copy from one memory location to another, however, it does require time in the kernel running on the host processor CPU, such as CPU 126, 128, and 130 in FIG. 1, to execute a task switch, pin the memory location, and then register the memory.

The mechanism of the present invention sets a timer, such as timer 1114, to delay when registered ULP buffer 1110 is actually deregistered. If consumer 1108 invokes a socket transfer call that uses a consumer buffer, which references an active, registered ULP buffer within the time set by timer 1114, then the socket library will not need to pin and register consumer buffer 1120. Instead, registered ULP buffer 1110 can be reused, because it is still registered on the IPSOE as registered ULP buffer 1110 and timer 1114 will be disabled until the socket transfer call completes. This timer is referred to as a lazy deregistration timer. In these examples, this timer can be a multi-bit value that allows for dynamic optimization when delaying the deregistration of a ULP memory region containing the buffer. Although a single timer is illustrated for purposes of describing the invention, many timers may be in use. Each registered ULP buffer within ULP memory region 1112 is associated with a timer. In these examples, the ULP buffers are registered and deregistered, rather than the entire memory region.

Figure 12A:
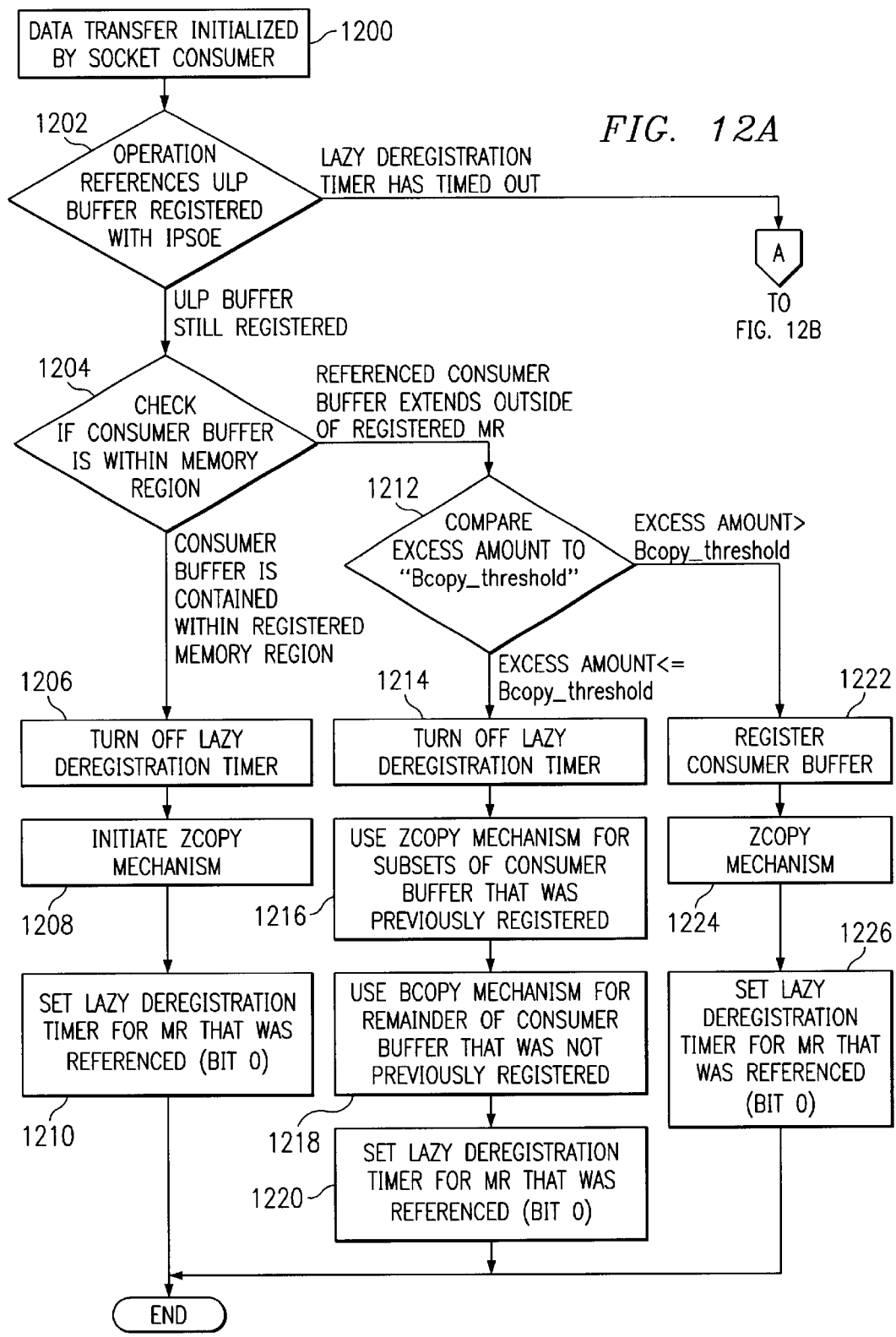

FIGS. 12A and 12B show a flowchart for the algorithm to select between the Bcopy or the Zcopy functions for initial data transfers in accordance with a preferred embodiment of the present invention. The process illustrated in FIGS. 12A and 12B is performed by a socket library, such as socket library 1106 in FIG. 11. The socket library uses the socket driver to register memory.

The basis for selection of a particular copy mechanism, Bcopy or Zcopy, is the pathlength to carry out each of the two copy operations. A Bcopy Threshold is used by socket library 1106, in FIG. 11, to control whether to use private buffers or convert the consumer buffer into a registered ULP buffer through the socket driver registration process. In these examples, distinct Bcopy thresholds are present for both send and receive operations. In other words, one threshold may be used for a send operation, while a different threshold may be used for a receive operation. The following description is the preferred implementation to determine the size of the Bcopy Threshold.

For Send operations, the number of instructions per byte transferred required to perform a Bcopy are determined. Typically, the number of instructions per byte has a fixed and a variable component. The fixed component (BCopy_fixed) consists of the number of instructions required to copy one byte from a consumer buffer to a pre-registered private buffer, request the transfer for the one byte, and handle the send completion. The variable component (BCopy_variable) consists of the number of instructions required to copy an additional byte from the consumer buffer to the pre-registered buffer. If N is the number of bytes transferred and all calculations are integer, then the total CPU overhead is:

$$BCopy\_fixed + (N \times BCopy\_variable).$$

Next, the number of instructions per byte transferred required to perform a Zcopy are determined. Again, the number of instructions per byte has a fixed and a variable component. The fixed component (ZCopy_fixed) consists of the number of instructions required to transition to the kernel, register one byte of the consumer buffer (includes pinning the memory, performing the address translation, and creating the memory protection and translation table entry), request the transfer, handle the send completion, and deregister one byte of the registered ULP buffer. The variable component (Zcopy_variable) consists of the number of instructions required to transfer additional pages (pinning the additional memory, performing the additional address translation, and storing the additional information in the memory protection and translation table entry, and unpinning the additional memory pages). If N is the number of bytes transferred and page_size is the size of page used in a memory protection and translation table and all calculations are integer, then the total CPU overhead for a Zcopy operation is:

$$ZCopy\_fixed + ((N/page\_size) \times ZCopy\_variable).$$

By setting the Zcopy overhead equal to the Bcopy overhead and solving for N, N becomes the Bcopy_threshold_send. The Bcopy_threshold_receive is obtained similarly by determining the number of instructions per byte transferred required to perform a Bcopy. Again, the number of instructions per byte has a fixed and a variable component. The fixed component (BCopy_fixed) consists of the number of instructions required to request the receive into a private buffer, handle the receive completion, and copy one byte from the pre-registered private buffer into the consumer buffer upon receiving a Bcopy Data message. The variable component (BCopy_variable) consists of the number of instructions required to copy an additional byte from the pre-registered private buffer to the consumer buffer. If N is the number of bytes transferred and all calculations are integer, then the total CPU overhead for a Bcopy_receive is:

$$BCopy\_fixed + (N \times BCopy\_variable).$$

Thereafter, the number of instructions per byte transferred required to perform a Zcopy are determined. Again, the number of instructions per byte has a fixed and a variable component. The fixed component (ZCopy_fixed) consists of the number of instructions required to transition to the kernel, register one byte of the consumer buffer (includes pinning the memory, performing the address translation, and creating the memory protection and translation table entry), request the receive, handle the receive completion, and deregister one byte of the registered ULP buffer (which includes unpinning the memory pages). Pinning memory serves to lock the memory from use by other processes. The pinned memory is locked for use by a particular process or for a particular operation. The variable component (Zcopy_variable) consists of the number of instructions required to transfer additional receive pages (pinning the additional memory, performing the additional address translation, and storing the additional information in the memory protection and translation table entry, deregistering and unpinning the additional memory pages).

Again, if N is the number of bytes transferred and page_size is the size of the page used in the memory protection and translation table and all calculations are integer, then the total CPU overhead for a Zcopy operation is:

$$ZCopy\_fixed + ((N/page\_size) \times ZCopy\_variable).$$

By setting the Zcopy overhead equal to the Bcopy overhead and solving for N, N becomes the Bcopy_threshold_receive.

The Bcopy_threshold is then the value associated with the current operation (send or receive) and is used to select either the Bcopy mechanism or the Zcopy mechanism, as illustrated in the flowchart in FIGS. 12A and 12B.

The process begins with a data transfer being initiated by the socket consumer (step 1200). At this time, a check is made by the IPSOE as to whether the operation references a currently registered ULP buffer, which has been previously registered with the IPSOE (step 1202). This step is used to determine whether the operation references an already registered buffer.

If the consumer buffer has been previously registered, the socket library checks to see if the entire consumer buffer is within a previously registered memory region (MR) (step 1204). In step 1204, the consumer buffer designated for the transfer may overlap a previously registered ULP buffer. The memory region referenced in this step is that of one or more registered ULP buffers that have not yet deregistered. If the consumer buffer is entirely contained within the registered memory region, then the lazy deregistration timer is turned off (step 1206). This timer is turned off by setting both bits to 0. Thereafter, a Zcopy mechanism is used to transfer the data (step 1208), and bit 0 of the associated lazy deregistration timer for the referenced memory region (MR) is set to 1 (step 1210) with the process terminating thereafter.

With reference again to step 1204, if the referenced consumer buffer extends outside of the registered memory region, the IPSOE compares the excess amount to the Bcopy_threshold (step 1212). The particular threshold value used depends upon the type of operation, send or receive. If the excess amount is less than or equal to the Bcopy_threshold, then the IPSOE turns off the lazy deregistration timer (step 1214). The Zcopy mechanism is then used to transfer the subsets of the consumer buffer that are contained within the registered memory region (step 1216). Then, the Bcopy mechanism is used to copy the remainder of the consumer buffer that was not previously registered (step 1218). Bit 0 of the associated lazy deregistration timer for the referenced memory region is set to 1 (step 1220) with the process terminating thereafter.

Referring again to step 1212, if the excess amount of space in the buffer outside of the registered memory region is greater than the Bcopy_threshold, then the socket library registers the consumer buffer through a socket command (step 1222). The IPSOE then uses the Zcopy mechanism to transfer the data (step 1224). Finally, bit 0 of the associated lazy deregistration timer for the referenced memory region is set to 1 and bit 1 is set to 0 (step 1226) with the process terminating thereafter.

Turning back to step 1202, if the consumer buffer designated for the transfer is not registered, then either the lazy deregistration timer has timed out or the consumer buffer has never been registered. In either case, the memory region must be registered again. When the ULP buffer is not registered as a result of the check made in step 1202, then in order for socket consumer to initiate a data transfer, the IPSOE compares the consumer buffer size needed for the data transfer to the appropriate Bcopy_threshold_send (step 1228). The value for the Bcopy_threshold may differ between a send and a receive operation for transferring data.

If the consumer buffer size is less than or equal to the appropriate Bcopy_threshold, then the Bcopy mechanism is used to transfer the data (step 1230) with the flowchart process terminating thereafter. With reference again to step 1228, if the consumer buffer size is greater than the appropriate Bcopy_threshold, then the Zcopy mechanism is used to transfer the data (step 1232) and then bit 0 of the associated lazy deregistration timer for the referenced memory region is set to 1 and set bit 1 to 0 (step 1234) with the process terminating thereafter.

Figure 13:
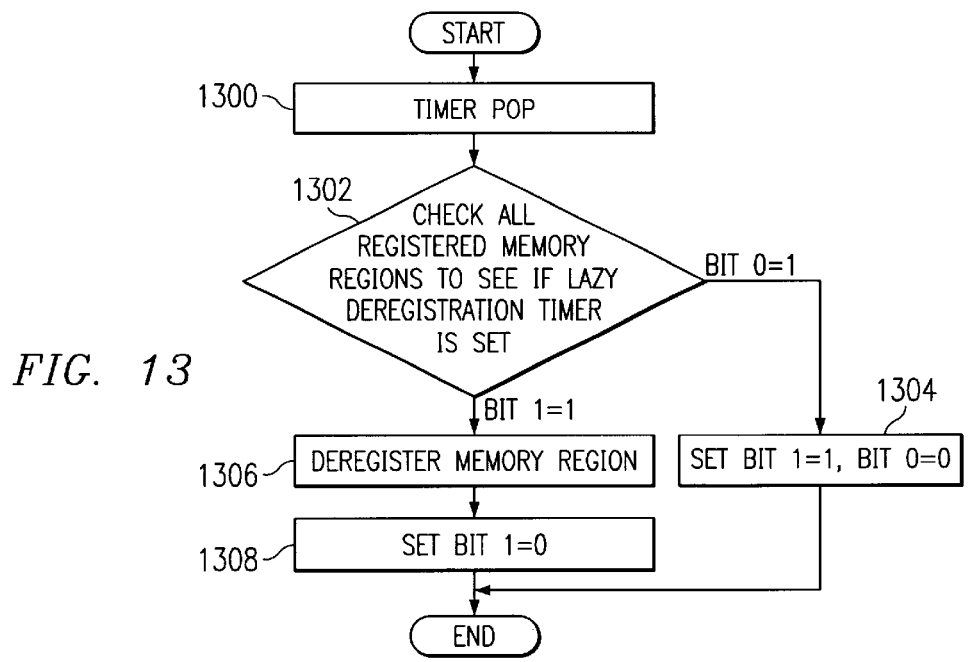
FIG. 13 is a flowchart depicting a mechanism by which the lazy deregistration timer is checked after a set amount of time in accordance with a preferred embodiment of the present invention.

With reference now to FIG. 13, a flowchart depicting a mechanism by which the lazy deregistration timer is checked after a set amount of time is depicted in accordance with a preferred embodiment of the present invention. When a registered ULP buffer is referenced by using the Zcopy mechanism, the Lazy deregistration timer bit 0 is set to 1, as occurs in steps 1210, 1220, 1226, and 1234 in FIGS. 12A and 12B above. The flowchart process begins by waiting for a timer pop (step 1300). When the timer pop goes off, the lazy deregistration timer for each of the registered memory regions is checked to see if the lazy deregistration timer is set (step 1302). If bit 0 is set to 1, then this is the first timer pop to be executed since the memory region had last been referenced. In this case, bit 0 is set to 0 and bit 1 is set to 1 to represent that a timer pop has been executed (step 1304) with the flowchart process terminating thereafter.

The case where a timer pop had previously been executed occurs when bit 1 is equal to 1. When this happens, the memory region associated with the timer pop is deregistered (step 1306) and the lazy deregistration timer bit 1 is set to 0 (step 1308) with the process terminating thereafter.

Thus, the present invention provides a method, apparatus, and computer implemented instructions for managing data transfers. The mechanism of the present invention employs a timer to implement lazy deregistration of memory regions. A memory region that has been registered for use in a data transfer is deregistered after a selected period of time has passed, which occurs with a timer pop in these examples. In this manner, additional data transfers may occur using the same registered memory region without requiring reregistration. By avoiding the registration step, additional time and overhead required for a data transfer is avoided. There are many factors that could change the length of time for a lazy deregistration timer which include the size of the buffer and the frequency with which a ULP buffer is referenced. When a buffer is repeatedly used, the timer should be set for a longer duration because it will likely be used again.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for managing memory, the method comprising:

responsive to a data transfer request from a requester, registering a section of memory for use in a data transfer to form a section of registered memory, wherein the section of memory is pinned ensuring that every page in the memory region is resident in memory; and responsive to the data transfer completing, deregistering the section of memory after a selected period of time, wherein another data transfer request occurring before the selected period of time is handled using the section of memory without requiring a second registration of the memory region.

2. The method of claim 1, wherein the deregistering step comprises:

starting a timer set to expire after the selected period of time; and deregistering the section of memory after the timer expires.

3. The method of claim 1, wherein the data transfer occurs using a Zcopy mechanism, wherein a data copy is unrequired to transfer the data to the requester.

4. The method of claim 1, wherein the data transfer takes place using a buffer located within the section of registered memory.

5. The method of claim 1 further comprising:

responsive to receiving the another data transfer request from another requester in which the data transfer request references a buffer contained in the section of memory, determining whether the section of memory is registered;

responsive to the memory being registered, determining whether the buffer is contained entirely within the section of memory; and responsive to the buffer being contained entirely within the section of memory, performing another data transfer by reusing the buffer for the another data transfer request.

6. The method of claim 5 further comprising:
responsive to a first portion of the buffer being within the section of registered memory and a second portion of the buffer being outside the section of registered memory, comparing a size of the second portion of the buffer outside of the section of registered memory with a threshold; and
responsive to the size being less than or equal to the threshold, performing the another data transfer by reusing the first portion of the buffer for the another data transfer if the first portion of the buffer is still registered and copying the data in the second portion of the buffer to another buffer for the requester.

7. The method of claim 6 further comprising:
responsive to the size being greater than the threshold, registering the buffer; and
transferring the data to the another requestor by reusing the buffer if the buffer is still registered.

8. The method of claim 3, wherein the another data transfer request references the section of memory for use in transferring the data to the requester.

9. A method in a data processing system for managing memory, the method comprising:
receiving a request for a transfer of data from a consumer;
determining whether the request references a buffer;
responsive to the request referencing the buffer, determining whether the buffer is within a registered memory region for a first type of data transfer;
responsive to the buffer being within the registered memory region for the first type of transfer, transferring the data using the first type of transfer, wherein a deregistration timer used to deregister the memory region after a period of time is disabled until the transfer of data has completed;
responsive to a first portion of the buffer being inside the memory region and a second portion of the buffer being outside the registered memory region for the first type of transfer, comparing a size of the second portion to a threshold;
transferring data in the first portion of the buffer in the registered memory region using the first type of data transfer if the size of the second portion of the buffer is less than or equal to the threshold, wherein the deregistration timer is disabled; and
transferring data in the second portion of the buffer using the second type of data transfer if the size of the second portion is less than or equal to the threshold.

10. The method of claim 9 further comprising:
if the size of the second portion of the buffer is greater than the threshold, registering a memory region encompassing the second portion of the buffer to form a new registered memory region for the first type of data transfer; and
transferring the data using the first type of transfer, wherein the deregistration timer used to deregister the new registered memory region after a period of time is disabled until after the transfer of data has completed.

11. The method of claim 9, wherein the first type of data transfer uses a Zcopy mechanism and the second type of data transfer uses a Bcopy mechanism.

12. The method of claim 9 further comprising: responsive to an expiration of the deregistration time, deregistering the registered memory region for use in the first type of transfer.

13. The method of claim 9, wherein the deregistration timer is disabled by preventing starting of the timer until the transfer of data completes.

14. The method of claim 9 further comprising:
responsive to the request referencing an unregistered buffer, comparing a size of the unregistered buffer to a threshold; and
responsive to the size of the unregistered buffer being greater than the threshold, transferring the data using the first type of data transfer.

15. The method of claim 13, wherein the first type of data transfer uses a Zcopy mechanism.

16. The method of claim 9, wherein the registered buffer is a Upper Layer Protocol buffer.

17. A data processing system for managing memory, the data processing system comprising:
a bus system;
a communications unit connected to the bus system;
a memory connected to the bus system, wherein the memory includes a set of instructions; and
a processing unit connected to the bus system, wherein the processing unit executes the set of instructions to register a section of memory for use in a data transfer to form a section of registered memory in which the section of registered memory is pinned ensuring that every page in the memory region is resident in memory in response to a data transfer request from a requester; and deregister the section of memory after a selected period of time in which another data transfer request occurring before the selected period of time is handled using the section of memory without requiring a second registration of the memory region in response to the data transfer completing.

18. A data processing system for managing memory, the data processing system comprising:
a bus system;
a communications unit connected to the bus system;
a memory connected to the bus system, wherein the memory includes a set of instructions; and
a processing unit connected to the bus system, wherein the processing unit executes the set of instructions to receive a request for a transfer of data from a consumer; determine whether the request references a buffer; determine whether the buffer is within a registered memory region for a first type of data transfer in response to the request referencing the buffer; transfer the data using the first type of transfer in which a deregistration timer used to deregister the memory region after a period of time is disabled until the transfer of data has completed in response to the buffer being within the registered memory region for the first type of transfer; compare a size of the second portion to a threshold responsive to a first portion of the buffer being inside the memory region and a second portion of the buffer being outside the registered memory region for the first type of transfer; transfer data in the first portion of the registered memory region using the first type of data transfer if the size of the second portion is less than or equal to the threshold in which the deregistration timer is disabled; and transfer data in the second portion of the registered memory region using the second type of data transfer if the size of the second portion is less than or equal to the threshold.

19. A data processing system for managing memory, the data processing system comprising:
registering means, responsive to a data transfer request from a requester, for registering a section of memory for use in the data transfer to form a section of registered memory, wherein the section of memory is pinned ensuring consistent virtual-to-physical translations; and deregistering means, responsive to the data transfer completing, for deregistering the section of memory after a selected period of time, wherein another data transfer request occurring before the selected period of time is handled using the section of memory without requiring a second registration of the memory region.

20. The data processing system of claim 19, wherein the deregistering means is a first deregistering means and comprises:

starting means for starting a timer set to expire after the selected period of time; and means for deregistering the section of memory after the timer expires.

21. The data processing system of claim 19, wherein the data transfer occurs using a Zcopy mechanism, wherein a data copy is unrequired to transfer the data to the requester.

22. The data processing system of claim 19, wherein the data transfer takes place using a buffer located within the section of registered memory.

23. The data processing system of claim 20 further comprising:

first determining means, responsive to receiving the another data transfer request from another requestor in which the data transfer request references a buffer contained in the section of memory, for determining whether the section of memory is registered;

second determining means, responsive to the memory being registered, for determining whether the buffer is contained entirely within the section of memory; and performing means, responsive to the buffer being contained entirely within the section of memory, for performing another data transfer by reusing the buffer for the another data transfer request if the buffer is still registered.

24. The data processing system of claim 23 further comprising:

comparing means, responsive to a first portion of the buffer being within the section of registered memory and a second portion of the buffer being outside the section of registered memory, for comparing a size of the second portion of the buffer outside of the section of registered memory with a threshold; and performing means, responsive to the size being less than or equal to the threshold, for performing the another data transfer by reusing the first portion of the buffer for the another data transfer if the first portion of the buffer is still registered and copying the data in the second portion of the buffer to another buffer for the requester.

25. The data processing system of claim 24 wherein the registering means is a first registering means and further comprising:

second registering means, responsive to the size being greater than the threshold, for registering the buffer; and transferring means for transferring the data to the another requester by reusing the buffer if the buffer is still registered.

26. The data processing system of claim 21, wherein the another data transfer request references the section of memory for use in transferring the data to the requester.

27. A data processing system for managing memory, the data processing system comprising:

receiving means for receiving a request for a transfer of data from a consumer;

first determining means for determining whether the request references a buffer;

second determining means, responsive to the request referencing the buffer, for determining whether the buffer is within a registered memory region for a first type of data transfer;

first transferring means, responsive to the buffer being within the registered memory region for the first type of transfer, for transferring the data using the first type of transfer, wherein a deregistration timer used to deregister the memory region after a period of time is disabled until the transfer of data has completed;

comparing means, responsive to a first portion of the buffer being inside the memory region and a second portion of the buffer being outside the registered memory region for the first type of transfer, for comparing a size of the second portion to a threshold;

second transferring means for transferring data in the first portion of the buffer in the registered memory region using the first type of data transfer if the size of the second portion of the buffer is less than or equal to the threshold, wherein the deregistration timer is disabled; and third transferring means for transferring data in the second portion of the buffer using the second type of data transfer if the size of the second portion is less than or equal to the threshold.

28. The data processing system of claim 27 further comprising:

registering means, if the size of the second portion of the buffer is greater than the threshold, for registering a memory region encompassing the buffer to form a new registered memory region for the first type of data transfer; and fourth transferring means for transferring the data using the first type of transfer, wherein the deregistration timer used to deregister the new registered memory region after a period of time is disabled until after the transfer of data has completed.

29. The data processing system of claim 27, wherein the first type of data transfer uses a Bcopy mechanism and the second type of data transfer uses a Zcopy mechanism.

30. The data processing system of claim 27 further comprising:

deregistering means, responsive to an expiration of the deregistration time, for deregistering the registered memory region for use in the first type of transfer.

31. The data processing system of claim 27, wherein the deregistration timer is disabled by preventing starting of the timer such until the transfer of data completes.

32. The data processing system of claim 27 wherein the comparing means is a first comparing means and further comprising:

second comparing means, responsive to the request referencing an unregistered buffer, for comparing a size of the unregistered buffer to a threshold; and fourth transferring means, responsive to the size of the unregistered buffer being greater than the threshold, for transferring the data using the first type of data transfer.

33. The data processing system of claim 31, wherein the second type of data transfer uses a Zcopy mechanism.

34. The data processing system of claim 27, wherein the registered buffer is a Upper Layer Protocol buffer.

35. A computer program product in a computer readable medium for managing memory, the computer program product comprising:

first instructions, responsive to a data transfer request from a requester, for registering a section of memory for use in the data transfer to form a section of registered memory, wherein the section of memory is pinned ensuring consistent virtual-to-physical translations; and second instructions, responsive to the data transfer completing, for deregistering the section of memory after a selected period of time, wherein another data transfer request occurring before the selected period of time is handled using the section of memory without requiring a second registration of the memory region.

36. A computer program product in a computer readable medium for managing memory, the computer program product comprising:

first instructions for receiving a request for a transfer of data from a consumer;

second instructions for determining whether the request references a buffer;

third instructions, responsive to the request referencing the buffer, for determining whether the buffer is within a registered memory region for a first type of data transfer;

fourth instructions, responsive to the buffer being within the registered memory region for the first type of transfer, for transferring the data using the first type of transfer, wherein a deregistration timer used to deregister the memory region after a period of time is disabled until the transfer of data has completed;

fifth instructions, responsive to a first portion of the buffer being inside the memory region and a second portion of the buffer being outside the registered memory region for the first type of transfer, for comparing a size of the second portion to a threshold;

sixth instructions for transferring data in the first portion of the registered memory region using the first type of data transfer if the size of the second portion is less than or equal to the threshold, wherein the deregistration timer is disabled; and seventh instructions for transferring data in the second portion of the registered memory region using the second type of data transfer if the size of the second portion is less than or equal to the threshold.

* * * * *

UNITED STATES PATENT AND TRADEMARK OFFICE
CERTIFICATE OF CORRECTION

PATENT NO. : 6,823,437 B2 Page 1 of 1
DATED : November 23, 2004
INVENTOR(S) : Boyd et al.

It is certified that error appears in the above-identified patent and that said Letters Patent is hereby corrected as shown below:

Column 18,
Line 32, after "from a" delete "requester" and insert -- requestor --.
Line 52, after "to the" delete "requester" and insert -- requestor --.
Line 58, after "another" delete "requester" and insert -- requestor --.

Column 19,
Line 13, after "for the" delete "requester" and insert -- requestor --.
Line 21, after "to the" delete "requester" and insert -- requestor --.

Column 20,
Lines 24 and 64, after "from a" delete "requester" and insert -- requestor --.

Column 21,
Line 19, after "data to the" delete "requester" and insert -- requestor --.
Line 51, after "for the" delete "requester" and insert -- requestor --.
Line 59, before "by reusing" delete "requester" and insert -- requestor --.
Line 63, after "to the" delete "requester" and insert -- requestor --.

Column 23,
Line 5, after "from a" delete "requester" and insert -- requestor --.

Signed and Sealed this

Twenty-first Day of February, 2006

JON W. DUDAS
*Director of the United States Patent and Trademark Office*